(12) United States Patent
Uehara et al.

(10) Patent No.: US 6,477,380 B1
(45) Date of Patent: Nov. 5, 2002

(54) SYSTEM AND METHOD FOR ESTIMATING LOCATION OF MOBILE STATION

(75) Inventors: Junji Uehara, Tokyo (JP); Toshio Kato, Tokyo (JP); Kiyoki Sekine, Tokyo (JP); Ikuo Kawasumi, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/237,794

(22) Filed: Jan. 27, 1999

(30) Foreign Application Priority Data

Jan. 29, 1998 (JP) .......................................... 10-017400

(51) Int. Cl.$^7$ ................................................. H04Q 7/20
(52) U.S. Cl. ........................ 455/456; 455/522; 455/69; 455/63
(58) Field of Search ................................ 455/422, 440, 455/443, 501, 517, 456, 522, 524, 525, 63, 69, 70, 561, 560, 503; 342/457, 387, 126; 701/207; 340/825.49; 375/371; 370/509, 516, 518

(56) References Cited

U.S. PATENT DOCUMENTS

| 4,775,236 A | * | 10/1988 | Cohen et al. ............... 356/640 |
| 4,777,653 A | * | 10/1988 | Bonnerot et al. ........... 455/522 |
| 4,891,650 A | * | 1/1990 | Sheffer ....................... 701/207 |
| 5,614,914 A | * | 3/1997 | Bolgiano et al. ........... 342/457 |
| 5,886,857 A | * | 3/1999 | Symons et al. ........... 360/245.2 |
| 5,905,961 A | * | 5/1999 | Sanders et al. ............. 455/456 |
| 5,943,014 A | * | 8/1999 | Gilhousen .................. 455/456 |
| 6,154,657 A | * | 11/2000 | Grubeck et al. ............ 455/456 |
| 6,307,868 B1 | * | 10/2001 | Rakib et al. ................ 370/516 |

* cited by examiner

Primary Examiner—Vivian Chin
Assistant Examiner—James K Moore
(74) Attorney, Agent, or Firm—Venable; Norman N. Kunitz

(57) ABSTRACT

There has been such a drawback that it is difficult to accurately estimate the location of mobile station MS in a mobile communication system. To solve the problem, according to the mobile communication system of the present invention, a mobile station and several base station cooperate for estimation. First the base stations BS in which the mobile station is laid and other base stations adjacent thereto each measure the receipt levels of the radio wave radiated by the mobile station to notify the position manage center of the receipt levels. Second the position manage center instructs the mobile station to control the radio wave pursuant to the receipt levels in such a fashion the receipt levels are stabilized; finally. Third each base station measure the distance between the base station and the mobile station based upon the propagation time of the radio wave to inform the position manage center of the distance. Finally, the position manage center estimates the location of the mobile station based upon a point or several points given by the circles defined using the distances.

27 Claims, 7 Drawing Sheets

SYSTEM AND METHOD FOR ESTIMATING LOCATION OF MOBILE STATION

This patent application claims priority based on a Japanese patent application 10-017400, the contents of which are incorporated herein by reference.

BACKGROUND OF THE INVENTION

1. Field of the Invention

The present invention relates to a mobile communication system and a method therefor, and in particular to a method and an apparatus for estimating the location of a mobile station.

2. Description of the Prior Art

With recent development of mobile communication technique, there have been inexpensively provided mobile terminals, such as a portable telephone, a PHS (Personal Handy Set), and a pager. This provision varies services employing the mobile terminals.

Among the services is a service that estimates the location of a mobile apparatus or a person carrying a mobile apparatus. The service specifies the location, for example, by pursuing or chasing the radio wave radiated from the mobile apparatus, e.g., a radio apparatus. The service is-available to a building management system, which manages the location and the entrance and exit of a person carrying an ID card capable of communicating, through transmitting and receiving radio waves and infrared rays to/from the ID card.

Assuming such a location estimating service is provided using a PHS, the location of a person carrying the PHS is specified by clarifying which of cells the person exists in. The specifying is accompanied by an error because the cells have a given extent or expanse. Since the error depends upon the radius of the cells, even the smallest cell might cause an error, i.e., several hundred meter equivalent to the radius of the cell. On the other hand, assuming the location estimating service is provided using a portable telephone, the location of a person carrying the portable telephone is specified with a larger error because the cells used therefor are larger in radius than those used for the PHS. To summarize, the conventional mobile communication system involving a PHS and a portable telephone for the location estimating service has failed to accurately estimate the location of a mobile station.

SUMMARY OF THE INVENTION

It is therefore an object of the present invention to provide a mobile communication system and a method therefor capable of accurately estimating the location of the mobile station.

According to one aspect of the present invention, a plurality of base stations transmit and receive a frame to/from the mobile station. A manage station unifies the plurality of base stations. The manage station comprises an estimating circuit which estimates the location of the mobile station based upon a plurality of locations of the plurality of base stations and a plurality of distances between the plurality of base stations and the mobile station.

According to another aspect of the present invention, there is provided a manage station for use in a mobile communication system including a mobile station and a plurality of base stations communicating with the mobile station. The manage station comprises an estimating circuit which estimates the location of the mobile station based upon a plurality of locations of the plurality of base stations and a plurality of distances between the plurality of base stations and the mobile station.

According to still another aspect. of the present invention, there is provided a method of estimating the location of a mobile station in a mobile communication system in which the mobile station and a plurality of base stations communicating with each other. The method comprises the steps of measuring a plurality of distances between the plurality of base stations and the mobile station; preparing a plurality of circles each representing one of the locations of the plurality of base stations and the corresponding one of the plurality of distances to acquire a point at which the plurality of circles cross; and estimating the location of the mobile station based upon the point.

BRIEF DESCRIPTION OF THE DRAWINGS

The present invention will be understood more fully from the detailed description given hereinbelow, taken in conjunction with the accompanying drawings.

DESCRIPTION OF THE PREFERRED EMBODIMENTS

Figure 1A:
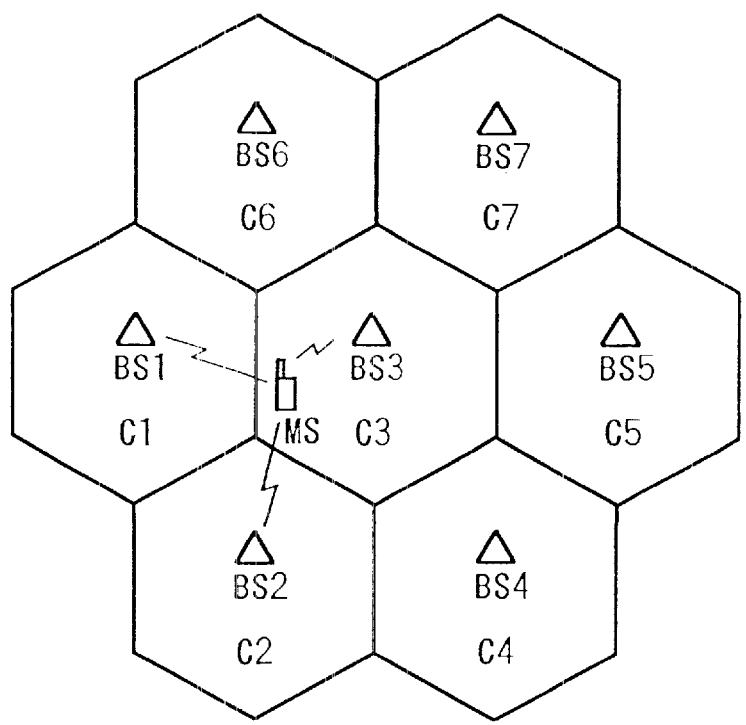
FIG. 1A is a schematic diagram showing a mobile station and a plurality of base stations.

Hereinafter, preferred embodiments of the mobile communication system for estimating the location of a mobile station according to this invention will be described in detail with reference to the accompanying drawings. In FIG. 1A, the mobile communication system has seven cells C1–C7, which are geographically independent of each other. Each cell in FIG. 1 is hexagonal for ease of explanation. Other various shapes, however, may be available for the cells in accordance with the geographical conditions and the like, which is easily understood to the artisan.

In each cell C is positioned a base station BS that communicate with a mobile station MS. More specifically, in each of the cells C1–C7 is positioned the corresponding one of the base stations BS1–BS7, whereas the mobile station MS can freely move from one of the cells C1–C7 to another thereof, thus being always under control by one of the base stations BS1–BS7.

Figure 1B:
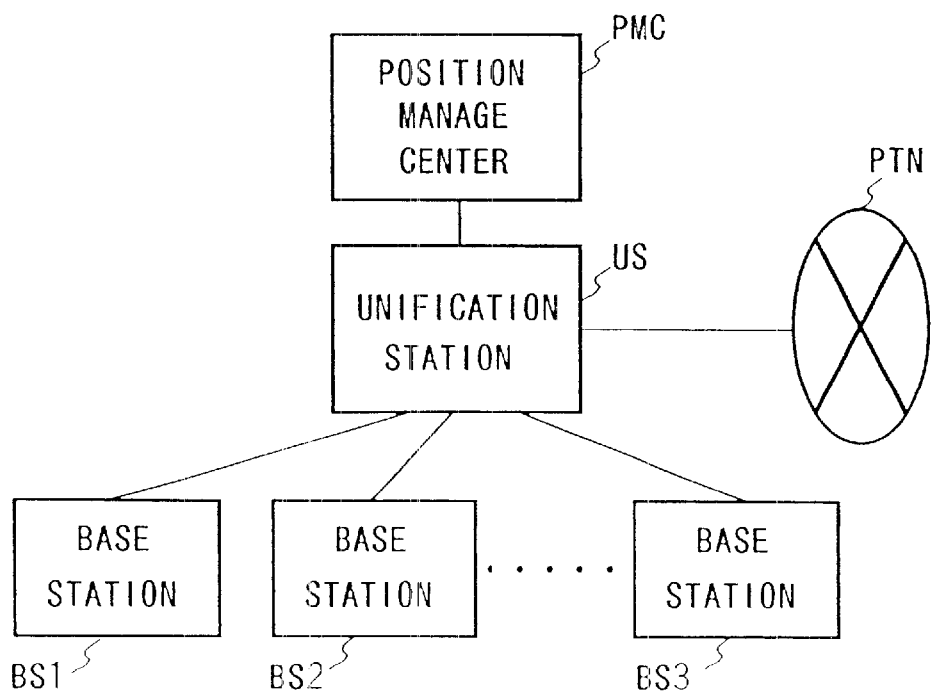
FIG. 1B is a schematic diagram showing a unification station and a position manage center.

In FIG. 1B, all the base stations BS1–BS7 are connected to the unification station US. The connection may be constructed with a cable and a radio wave. The unification station US is further connected to the position manage center PMC. The position manage center PMC controls the unification station US, the base stations BS1–BS7, and the mobile station MS to estimate the location of the mobile station MS. The unification station US is also connected to a public telephone network PTN.

Figure 2:
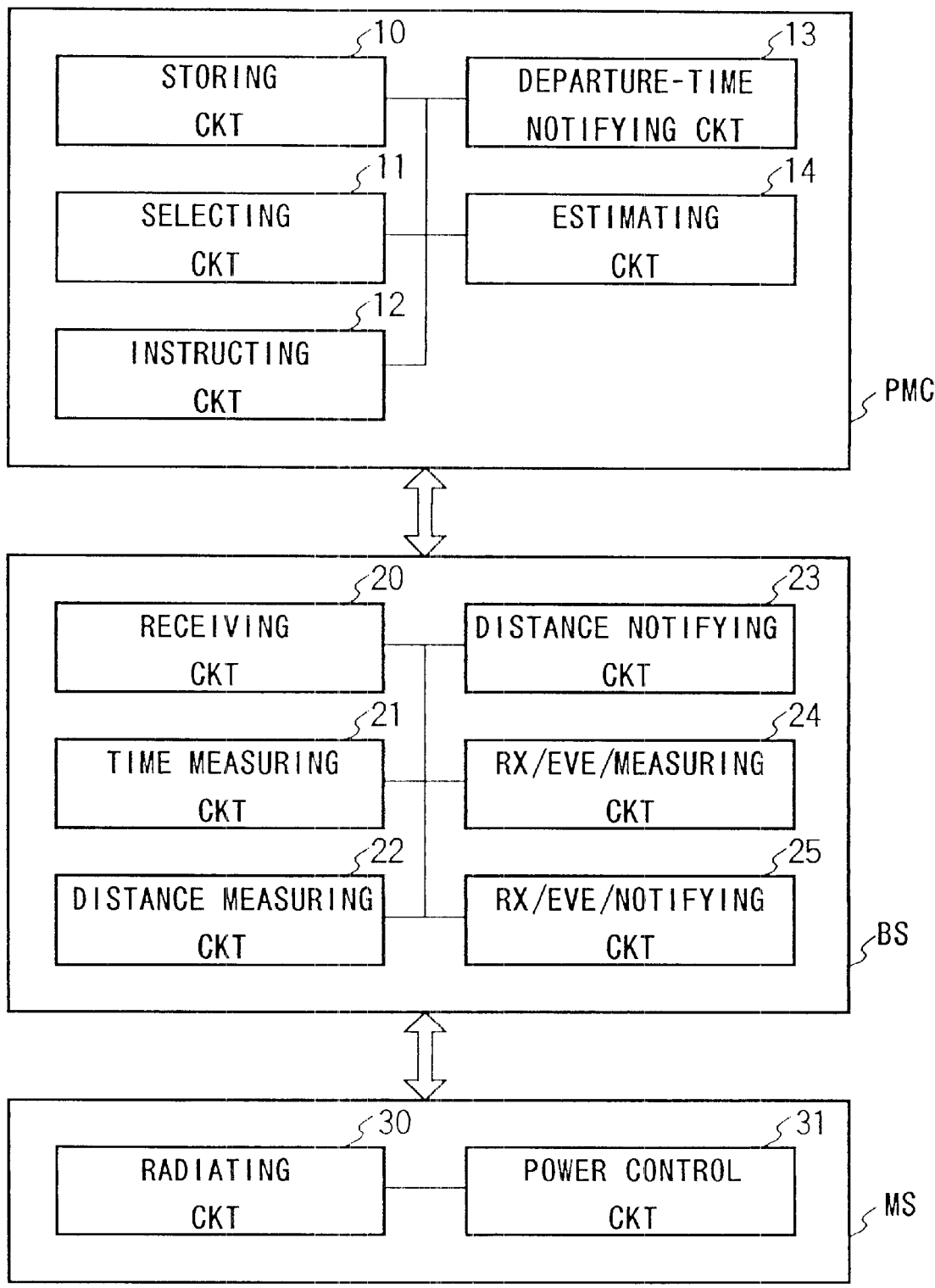
FIG. 2 is a block diagram showing configuration of a position manage center, a base station, and a mobile station for estimation.

Hereinafter, the configuration of the position manage center PMC, each base station BS, and the mobile station MS for estimating the location of a mobile station will be discussed. As shown in FIG. 2, the position manage center PMC incorporates a storing circuit 10, a selecting circuit 11, an instructing circuit 12, a departure-time notifying circuit 13, and an estimating circuit 14. The storing circuit 10 has stored data on locations of all the base stations BS1–BS7 in advance. The selecting circuit 11 selects several base stations suitable for estimation among the plurality of base stations BS1–BS7.

The instructing circuit 12 instructs the selected base stations to measure the distance between each base station BS and the mobile station MS, and also instructs the mobile station MS to control the transmission power of the radio wave with reference to the receipt levels of the radio wave at the base stations BSs. The departure-time notifying circuit 13 notifies the selected base stations of the departure time of the radio wave, more exactly, the departure time of a specified upward frame. The estimating circuit 14 collects from the base stations BSs the data on the distances between the base stations BSs and the mobile station MS, to estimate the location of the mobile station MS.

Each of the base station BS1–BS7 incorporates a receiving circuit 20, a time measuring circuit 21, a distance measuring circuit 22, a distance notifying circuit 23, a receipt level measuring circuit 24, and a receipt level notifying circuit 25.

The receiving circuit 20 receives the radio wave or a upward frame from the mobile station MS. The time measuring circuit 21 measures the period of time for a specified upward frame to reach the base station BS from the mobile station MS, using the departure time notified by the position manage center PMC and the arrival time of the upward frame. The distance measuring circuit 22 measuring the distance based upon the period of time measured by the time measuring circuit 21 and the velocity of the radio wave. The distance notifying circuit 23 notifies the position manage center PMC of the distance measured by the distance measuring circuit 22. The receipt level measuring circuit 24 measures the receipt level of the radio wave transmitted from the mobile station MS. The receipt level notifying circuit 25 notifies the position manage center PMC of the receipt level measured by the receipt level measuring circuit 24.

The mobile station MS incorporates a radiating circuit 30, and a power control circuit 31. The radiating circuit 30 transmits an upward frame to the base station BS that directly controls and supervises the mobile station MS. For estimation of the location of the mobile station MS, the radiating circuit 30 radiates the radio wave over other base stations BSs or adjacent base stations BSs. The power control circuit 31 adjusts the transmission power of the radio wave pursuant to the instruction given by the position manage center PMC.

To facilitate measurement of the distances, the whole mobile communication system operates with synchronization established. For the synchronization, the unification station US or one of the base stations BS1–BS7 may be provided with a master clock generator to supply the master clock for all the base stations BSs or for the other base stations BSs while each base station BS may individually utilize the GPS (Global Positioning System). Between each base station BS and the mobile station MS is also maintained a synchronization.

Figure 3:
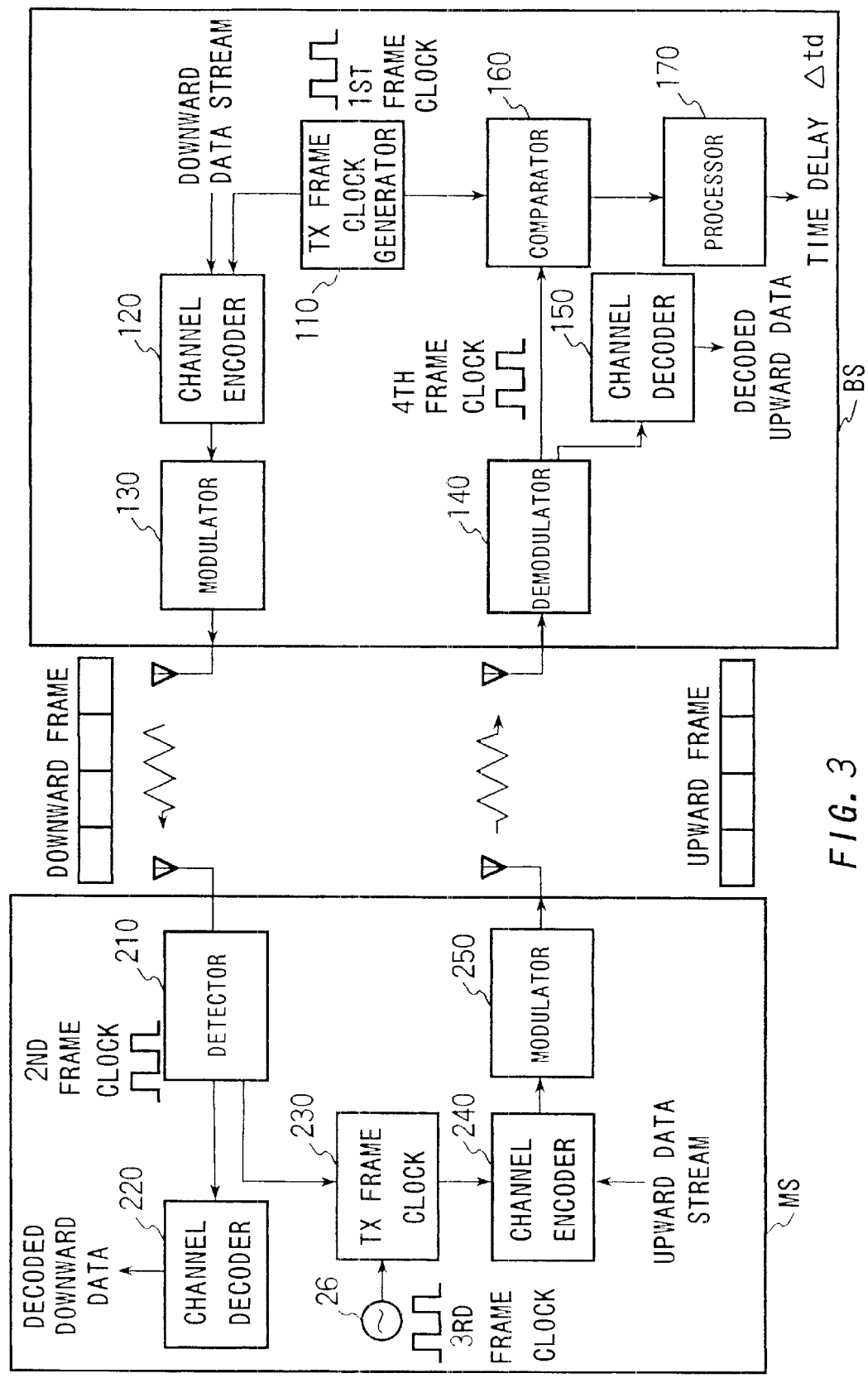
FIG. 3 is a block diagram showing configurations of a base station and a mobile station for synchronizing with each other.

Hereinbelow, the synchronization between a base station BS and a mobiles station MS in the mobile communication system will be discussed referring to FIG. 3. As shown in FIG. 3, the base station BS incorporates a transmission frame clock generator 110, a channel encoder 120, a modulator 130, a demodulator 140, a channel decoder 150, a comparator 160, and a processor 170 while the mobile station MS incorporates a detector 210, a channel decoder 220, a transmission frame clock generator 230, a channel encoder 240, a modulator 250, and a local oscillator 260. For ease of description, the frame send from the base station BS to the mobile station MS is referred to as "a downward frame" and the frame send from the mobile station MS to the base station BS is referred to as "a upward frame".

In the base station BS, the transmission frame clock generator 110 prepares a frame clock (hereinafter, referred to as "a first frame clock") used for the downward frame to feed the first frame clock to the channel encoder 120 and the comparator 160. To the channel encoder 120 is also fed a downward data stream. In synchronizing with the frame clock, the channel encoder 120 divides the downward data stream into a plurality of downward data each having a fixed data length, thus framing the plurality of data. Subsequently, the channel encoder 120 encodes each downward frame. Finally, the modulator 130 modulates the plurality of downward frames, thereby to transmit them to the mobile station MS.

In the mobile station MS, upon receipt of the downward frames, the detector 210 demodulates them, thus giving demodulated downward data to the channel decoder 220. The detector 210 also prepares a frame clock (hereinafter, referred to as "a second frame clock") using the received downward frames, thereby providing the second frame clock for the transmission frame clock generator 230. The channel decoder 220 decodes the downward data, whereby decoded downward data is prepared. The transmission frame clock generator 230 prepares a frame clock (hereinafter, referred to as "a third frame clock") for use in framing upward data using a local oscillator 260.

The transmission frame clock generator 230 compares the second frame clock and the third frame clock to detect a phase difference therebetween. The transmission frame clock generator 230 further compares the phase difference with a given criterion value. If the phase difference is smaller than the criterion value, the transmission frame clock generator 230 supplies the third frame clock to the channel encoder 240. If not, the transmission frame clock generator 230 shifts the phase of the third frame clock in such a fashion that the phase difference decreases. Consequently, the transmission frame clock generator 230 provides the channel encoder 240 with the third frame clock closed to the second frame clock.

In addition to the third frame clock, the channel encoder 240 is fed an upward data stream. Synchronizing with the third frame clock, the channel encoder 240 divides the upward data stream into a plurality of upward data each having a fixed frame length, thus to frame the plurality of upward data. Further, the channel encoder 240 encodes the plurality of upward frames. Finally, the modulator 250 modulates the plurality of upward frames, thereby sending them to the base station BS.

In the base station BS, upon receiving the upward frames, the demodulator 140 demodulates the upward frames to provide demodulated upward data for the channel decoder 150. The channel decoder 150 decodes the upward data, whereby decoded upward data is prepared. The demodulator 140 also prepares a frame clock (hereinafter, referred to as "a fourth frame clock") on the basis of the received upward frames, thus providing the fourth frame clock for the comparator 160. The comparator 160 compares the first frame clock given by transmission frame clock generator 110 and the fourth frame clock to obtain the phase difference therebetween, which is given to the processor 170.

In other words, the comparator 160 compares the departure time of the downward frame and the arrival time of the corresponding upward frame, to detect the time difference therebetween. From the phase difference or the time difference, the processor 170 obtains a time delay $\Delta td$. Herein, note that the time delay $\Delta td$ is defined as the period of time necessary for a round trip of a frame between the base station BS and the mobile station MS. The time delay $\Delta td$ serves to estimate the location of the mobile station MS, detail of which will be explained later. The synchronization of the whole system in the preferred embodiment enables accurate estimation of the mobile station's location as well as simplification of the system because such a synchronizing system is immune from a time lag due to a plurality of clock generators.

Figure 4:
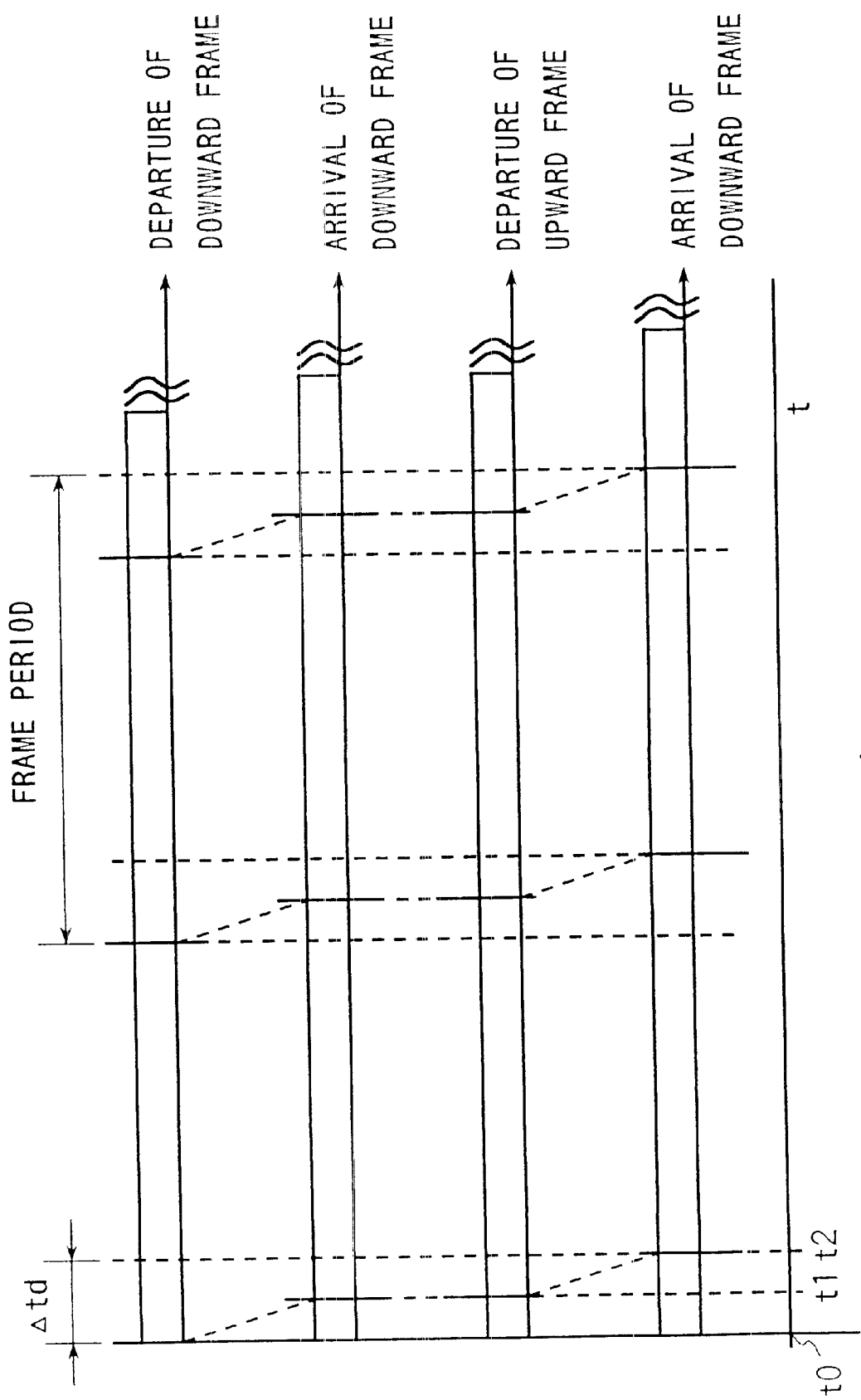
FIG. 4 is a time chart showing transmission and receipt of a frame between a base station and a mobile station.

The time delay $\Delta td$ will be described hereinbelow with reference to FIG. 4. A downward frame departing from the base station BS at time t0 arrives at the mobile station MS at time t1. The mobile station MS synchronizes with the base station BS, that is to say, the mobile station MS yields no time lag; therefore, an upward frame departs from the mobile station MS at the same time t1. This upward frame reaches the base station BS at time t2. In this case, the time delay $\Delta td$ is equivalent to the time difference between the departure time t0 of the downward frame and the arrival time t2 of the corresponding upward frame.

Figure 5:
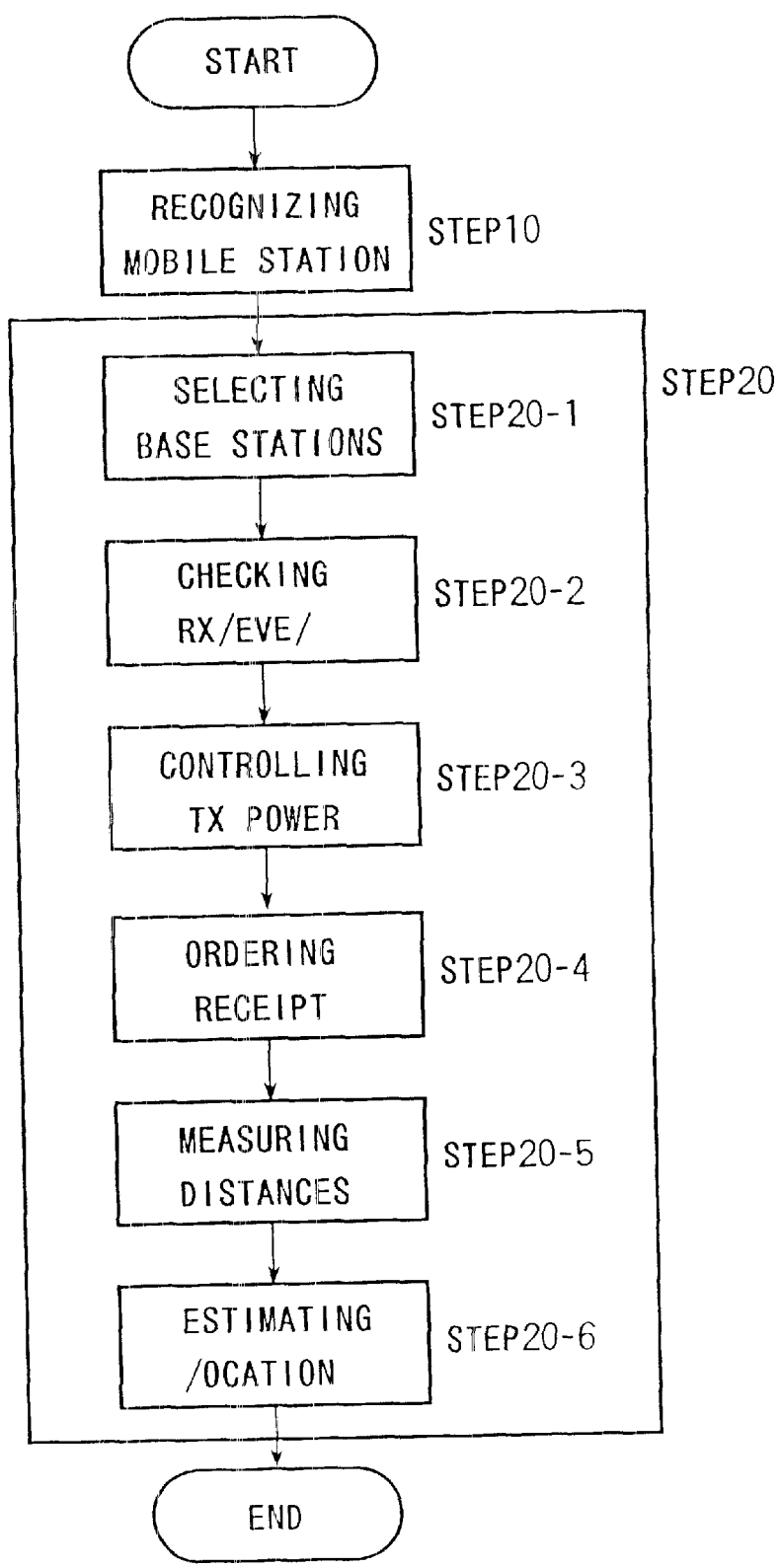
FIG. 5 is a flowchart showing the operation of the first embodiment of the mobile communication system.

Hereinbelow, the procedure of estimating the location of the mobile station MS will be now discussed in detail referring to FIG. 5. In the following description, it is assumed that the mobile station MS enters the cell C3 from one of the peripheral cells.

First, in step 10, the entrance of the mobile station MS is notified to the base station BS3, which is carries out, for example, by the access of the mobile station MS to the base station BS3 using an access channel and by a hand-off from the peripheral base station BS to the base station BS 3 during conversation or idling. The base station BS3, which manages the cell C3, notifies the position manage center PMC of the entrance via the unification station US. Based upon the notification, the position manage center PMC realizes the presence of the mobile station MS in the cell C3. In step 20, the position manage center PMC measures several distances used to estimate the location of the mobile station MS, which is pursuant to the following procedure.

(1) Selecting base stations BSs for measurement of the distances

In step 20-1, the position manage center PMC selects among the plurality of base stations BS1–BS7, several base stations BSs that serve to measure the distances. Specifically, the position manage center PMC designates the base station BS3 because the mobile station MS is laid in the cell C3 managed by the base station BS3. In addition, the position manage center PMC designates two base stations adjacent to the base station BS3, e.g. the base station BS1 and the base station BS2.

(2) Checking receipt level of the radio wave radiated by the mobile station MS

In step 20-2, the position manage center PMC orders the selected base stations BS1, BS2, and BS3 to measure the distances between the base stations BS1–BS3 and the mobile station MS. The measurement of the distance is carried out using the radio wave radiated by the mobile station MS. The position manage center PMC simultaneously notifies those base stations BS1–BS3 of information on the radio wave used by the mobile station MS. Since the base station BS3 has known the information, the position manage center PMC may notify the information to only the two base stations BS1 and BS2. The information involves, for example, the ID number of the mobile station MS, and the frequency, time slot, and code related to the channel for communication.

Responding to the instruction of the measurement, the base stations BS1–BS3 attempt to receive the radio wave from the mobile station MS. If receiving it, the base stations BS1–BS3 each measure the receipt levels of the radio wave. The base stations B1–B3 inform the position manage center PMC of whether or not the radio wave is received and how the receipt levels thereof is.

In general, the mobile station MS ordinarily radiates such a radio wave that can reach only the nearest base station B3S, i.e., the base station B3S managing the cell C in which the mobile station MS is laid. The purpose of limiting the transmission power of the radio wave is to avoid a co-channel interference and an adjacent channel interference in the peripheral cells. Accordingly, in the preferred embodiment, even though the radio wave radiated from the mobile station MS can arrive at the base station BS3, it might arrive at neither the base station BS1 nor the base station BS2. Since it is necessary for the radio wave to the adjacent base stations BS1 and BS2 to prepare a plurality of distances, the embodiment involves controlling the transmission of the radio wave, which will be discussed in detail below.

(3) Controlling the transmission power of the radio wave

In step 20-3, once reported the receipt levels from the base stations BS1–BS3, the position manage center PMC judges whether all the receipt levels are sufficient for the measurement of the distances or not. More definitely, the position manage center PMC compares the receipt levels with a given threshold. It is because the base stations BS1–BS3 need to receive upward frames with less errors, preferably no error. If all of them are larger than the threshold, it is not necessary to control the transmission power of the radio wave. However, if not, the position manage center PMC prepares for enhancement or increase of the transmission power.

First, the position manage center PMC computes the difference between each receipt level and the threshold. Second, on the basis of the differences, the position manage center PMC calculates such a transmission power that the receipt level at each base station BS exceeds the threshold. Finally, the position manage center PMC notifies the calculated transmission power and other information to the mobile station MS via the unification station US and the base station BS3. The position manage center PMC also notifies the transmission power and the information to both the base stations BS1 and BS2.

The information is relevant to upward frames to be transmitted having the calculated transmission power, namely, to which of upward frames is controlled. In other words, the departure time of an upward frame is notified to all the base stations BS1–BS3. For example, as the upward frame to undergo the enhancement of the transmission power, the information designates an arbitrary frame, several successive frames, or several consecutive frames. Under the notification from the position manage center PMC, the mobile station MS executes the enhancement of the transmission power on the frames. Consequently, the radio wave having more transmission power enables all the mobile stations BS1–BS3 to receive the radio wave with the receipt level exceeding the threshold.

(4) Ordering the base stations BSs to receive the enhanced radio wave

In step 20-4, the position manage center PMC orders via the unification station US, the base stations BS1–BS3 to receive the enhanced radio wave. Each base station BS receives the radio wave pursuant to the order.

(5) Measuring the distances by each base station BS

In step 20-5, the base station BS1–BS3 each measure the distance between each base station BS and the mobile station MS, and specifically measure the distance using the period of time for the radio wave to travel from the mobile station MS and to each base station BS. The detail of measuring is as following. Returning to FIG. 4, assuming that the base station BS3 transmits a downward frame to the mobile station MS at time t0, the mobile station MS receives the downward frame at time t1. Upon receipt of the downward frame, the mobile station MS radiates an upward frame at time t1. Since the position manage center PMC notifies the enhancement of the transmission power and the relevant information to all the base stations BS1–BS3, each base station BS has realized that the mobile station MS will radiate the upward frame at time t1.

Herein, if the mobile station MS has been instructed to increase the transmission power of the upward frame departing at time t1, the mobile station MS radiates an upward frame having more transmission power. The upward frame radiated by the mobile station MS reaches the base stations BS1–BS3 at different times. The differences among the arrival times depends upon the differences among the distances between the base stations BS1–BS3 and the mobile station MS. In other words, acquiring the period of times for one-ways or round-trips of a frame between the base stations BS1–BS3 and the mobile station MS enables acquiring the distances therebetween.

For example, if the upward frame reaches the base station BS1 at time t2-1, the base station BS1 computes the time difference between the departure time t1 of the upward frame and the arrival time t2-1 thereof. Herein, the time difference denotes the period of time for the upward frame to come from the mobile station MS to the base station BS1. Similarly, if the upward frame reaches the base station BS2 at time t2-2, the base station BS2 computes the time difference between the departure time t1 of the upward frame and the arrival time t2-2 thereof. The base station BS3 also computes the time difference between the departure time t1 of the upward frame and the arrival time t2 thereof.

To obtain the time difference, the base station BS3 may computes the time delay Δtd equivalent to the time or period for a round-trip therebetween to halve the time delay Δtd. Furthermore, since the propagation velocity of the radio wave is well-known, the base stations BS1–BS3 can calculate the distances (hereinafter, respectively referred to as "a distance D1", "a distance D2", and "a distance D3" for ease of explanation) between the respective base stations BS1–BS3 and the mobile station MS, using the respective time differences and the propagation velocity of the radio wave.

(6) Estimating the location of the mobile station MS

Figure 6:
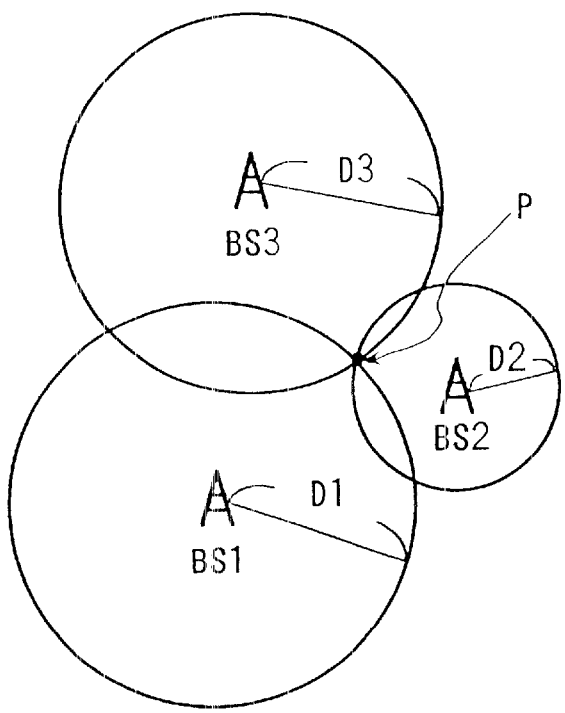
FIG. 6 is a diagram showing three circles and a point given by using measured distances.

In step 20-6, the base station BS1–BS3 report the respective distances D1–D3 to the position manage center PMC. Based upon those distances D1–D3, the position manage center PMC estimates the location of the mobile MS. More definitely, as shown in FIG. 6, the position manage center PMC prepares three circles, each center of which denotes one of the base stations BS1–BS3 while each radius of which denotes the corresponding one of the distances D1–D3. Since the three circles cross to share a point P, the position manage center PMC estimates that the point P represents the location of the mobile station MS.

As described above, according to the first preferred embodiment of the mobile communication system, a plurality of base stations BS1–BS3 calculate the period of time for the radio wave or the frame to come from the mobile station MS to the respective base stations BS1–BS3 to measure the corresponding distances D1–D3, thus estimating the location of the mobile station MS using those distances D1–D3. Therefore, differing from the conventional arts, this mobile communication system can accurately estimate the location.

The above embodiment arbitrarily select the peripheral base stations BS1 and BS2 for estimation and subsequently controls the transmission power of the radio wave in such a fashion that the receipt levels of those two base stations BS1 and BS2 are sufficient for estimation. However, it is possible to check the receipt levels of the peripheral base stations BS1, BS2, and BS4–BS7, and thereafter select two stations BSs that can best receive the radio wave from the mobile station MS based upon the result of checking. Those two base station BSs appear to exist closer to the mobile station MS, which decreases errors in measuring the distances to lead to more accurate estimation.

Moreover, in the above embodiment, the base stations BS1–BS3 acting for estimation are not replaced; however, they may be replaced according to necessity. For example, when judging that the base station BS1 can not work for estimation on the basis of the reports on the receipt levels from the base stations BS1–BS3, the position manage center PMC instructs the base station BS1 not to work for the estimation and another adjacent base station BS4 to work for the estimation, whereby the base stations BS2, BS3, and BS4 act for the estimation. Hence, the location of the mobile station MS can be always estimated accurately using the distances given by three base stations BSs.

In contrast with the embodiment that designates the base station BS3 which directly manages communication of the mobile station MS as one of the base stations BSs that should work for the estimation, another base station BS may be designated according to conditions; for example, the base station BS4 may be designated in lieu of the base station BS3. This can decrease the load of the base station BS3 associated with communication of the mobile station MS.

Since the position manage center PMC is provided to estimate the location of the mobile station MS, the position manage center PMC may be located anywhere as long as serving for the estimation. Moreover, such a function may be executed by the unification center US, for example.

<Second Embodiment>

Hereinafter, the second preferred embodiment of the mobile communication system will be now described in detail. The configuration of the second embodiment is the same as that of the first embodiment whereas there is a difference in operation therebetween. An explanation of the difference is made in detail below. In contrast with the first embodiment, the second embodiment gradually increases the transmission power of the radio wave to avoid a co-channel interference and an adjacent channel interference more effectively than the first embodiment.

Gradual increase of the transmission power is carried out as following. In step 20-3 of FIG. 5, first, upon receiving the notification indicative of enhancement of the transmission power and the related information relevant to upward frames, the mobile station MS radiates an upward frame having a transmission power slightly larger than usual (hereinafter, this larger transmission power is referred to as "a transmission power SP"). If the upward frame is received by all the base station BS1–BS3 with receipt level thereof beyond the above-mentioned threshold, the mobile station MS continues to radiate other upward frames using the same transmission power SP.

If not, however, each of the base stations BS1–BS3 notifies the position manage center PMC of failure in receiving the upward frame. Upon receipt of the notification, the position manage center PMC instructs the mobile station MS to increase the transmission power of another upward frame following the upward frame. According to the instruction, the mobile station MS enhances the transmission power of the following upward frame by transmission power ΔSP, whereby the following upward frame having the transmission power SP+ΔSP is radiated from the mobile station MS. If this upward frame is received by all the base stations BS1–BS3 with receipt level beyond the threshold and also there occurs neither a co-channel interference nor an adjacent interference therein, the mobile station MS radiates other upward frames using the transmission power SP+ΔSP likewise.

Nevertheless, if the upward frame having the transmission power SP+ΔSP fails to be received by all the base stations BS1–BS3, the mobile station MS enhances the transmission power of the further following upward frame by transmission power ΔSP again, similar to the above operation. Consequently, the upward frame having the transmission power SP+(ΔSP×2) is radiated by the mobile station MS. Such an operation is repeatedly carried out until an upward frame succeeds in reaching all the base stations BSs.

If there arises either a co-channel interference or an adjacent channel interference in one of the peripheral base stations BS1 and BS2 as a result of changing the transmission power into SP+ΔSP, the position manage center PMC orders the mobile station MS to decrease the transmission power of the following upward frames while forbidding more enhancement. Herein, the transmission power ΔSP may be fixed regardless of enhancement and may be changed for each enhancement while it may be changed according to the types of mobile stations MSs.

Once the increasing of the transmission power of the upward frames by ΔSP stepwise enables all the base stations BS1–BS3 to receive the upward frames, the position manage center PMC orders to the mobile station MS to maintain the same transmission power with respect to other upward frames. In this way, all the base stations BS1–BS3 can receive the radio wave from the mobile station MS.

As described above, according to the second embodiment, the transmission power of upward frames radiated by the mobile station MS is increased by ΔSP step by step. Since a slightly stronger radio wave has only a weak possibility of giving a co-channel interference and an adjacent channel interference to the peripheral base stations BS1 and BS2, such a enhancement can achieve prevention thereof.

The transmission power ΔSP may be also lessened to Δsp if an upward frame having a transmission power SP has been received in a good condition and a following upward frame having a transmission power (SP+Δsp) appears to completely reach the base stations BS1–BS3. This can decrease the power consumption of the mobile station MS and weaken the possibility of occurrence of both a co-channel interference and an adjacent channel interference.

<Third Embodiment>

Hereinbelow, the third preferred embodiment of the mobile communication system according to this invention will be now described in detail. The third embodiment is almost the same as the first embodiment in both configuration and operation, wherein the third embodiment features improvement of an error in estimating the location of the mobile station MS. The improving of the error will be detailed below.

Figure 7:
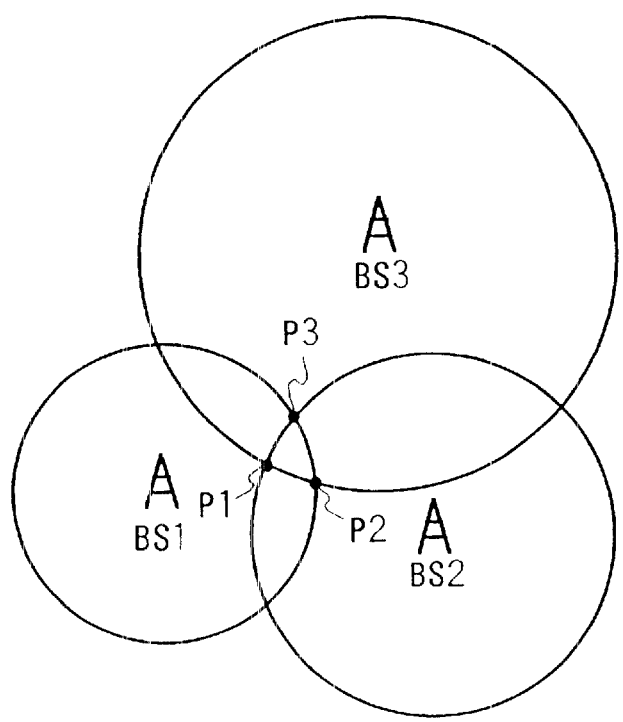
FIG. 7 is a diagram showing three error circles and points given by using measured distances.

As explained referring to FIG. 6 of the first embodiment, it is only one point P that the three circles share. In fact, however, the three circles seldom cross at only one point; they ordinarily cross at two or more points, e.g. at the points P1–P3 and other points as shown in FIG. 7. The reason is as following. The mobile communication system is prone to give a multi-path or a plurality of paths to a radio wave travelling between the mobile station MS and each of the mobile stations BS1–BS3. The multi-path is likely to oblige the radio wave to follow one of paths other than the shortest path. This lengthens the period of time for the radio wave to travel between the mobile station MS and each of the base stations BS1–BS3, thus to cause the base stations BS1–BS3 to estimate the distances to be longer than they are.

Consequently, such estimated distances provides the above three circles each having a radius longer than it is, which brings out two or more points as shown in FIG. 7. Among those points, the three points P1–P3 that are close to each other have stronger possibilities of serving to estimate the location of the mobile station MS. Occasionally, the location of the mobile station MS might be indicated by only one of the points P1–P3. However, to absolutely acquire the correct location, it is preferable to utilize all of those points P1–P3 as following: regarding the center of the circumscribed circle of the triangle having the vertexes P1–P3 as the location, regarding the center of the inscribed circle thereof as the location, and regarding the center of gravity thereof as the location.

As described above, even through the propagation condition such as a multi-path affects measurement of the distances, use of all the points given by the circles that each have a radius equal to one of the distances enables correct estimation of the location of the mobile station MS. Use of two among the three points P1–P3 allows estimation, with accuracy worse as compared with use of all.

<Fourth Embodiment>

The fourth preferred embodiment of the mobile communication system according to the present invention will be now discussed hereinafter. The fourth embodiment is nearly the same as the first embodiment in configuration and operation. Therefore, the difference therebetween will be explained in detail.

To estimate the location of the mobile station MS, the first embodiment employs three base stations BSs; on the contrary, the fourth embodiment employs more base stations BSs, e.g. six base stations BSs, which favors to improve the accuracy of estimation. To confirm the advantage of the fourth embodiment over the first embodiment, there is a possible experiment employing (i) three base stations BSs and (ii) six base stations BSs as follows:

(1) measuring the distances between the preselected three base stations BSs and a mobile station MS the location of which is clarified in advance (2) preparing circles using the measure distances and the locations of the base stations BSs (3) selecting one among the points given by the prepared circles
(4) computing the error between the selected point and the actual location of mobile station MS
(5) repeating (1)–(4) n times
(6) preparing such a temporary circle that involves (n X 0.683) mobile stations MSs among the above mobile stations MSs, i.e., a temporary circle with radius=1σ (σ denotes standard deviation)
(7) defining the temporary radius of the temporary circle to be "1" through normalization
(8) preparing a first circle whose radius is equivalent to the temporary radius and center is the center of gravity of the triangle having the three vertexes or points given by (i) the three base stations BSs
(9) preparing a second circle whose radius is equivalent to the temporary radius and center is the center of gravity of the hexagon having the six vertexes or points given by (ii) the six base stations BSs
(10) obtaining the number of mobile stations MSs within the first circle
(11) obtaining the number of mobile stations MSs within the second circle.

In fact, in lieu of performing the experiment, a simulation on gaps between estimated locations of the mobile station MS and the actual location thereof has been carried out for ease of proving the effect of the fourth embodiment, assuming that a plurality of points are distributed pursuant to normal distribution of two dimensions whose origin is the actual location of the mobile station MS, each point representing the intersection point closer to the mobile station MS among two intersection points given by two circles defined using two distances between the mobile station MS and two base stations BSs. Specifically, in the simulation, a program has been utilized that generates random numbers according to the normal distribution of two dimensions with average=0 and standard deviation=1, thus to provide such normal distribution.

On the above assumption, for (i) three base stations BSs, three locations of the mobile station MS, namely, the coordinates thereof have been extracted from the normal distribution of two dimensions to be used for calculating the center of gravity. Thereafter, the distance between the calculated center of gravity and the origin has been computed. Such a process has been repeatedly executed, thereby giving the cumulative probability of the centers of gravity with respect to the distances between the centers of gravity and the origin. For (ii) six base stations BSs, the above process has been carried out likewise.

Figure 8:
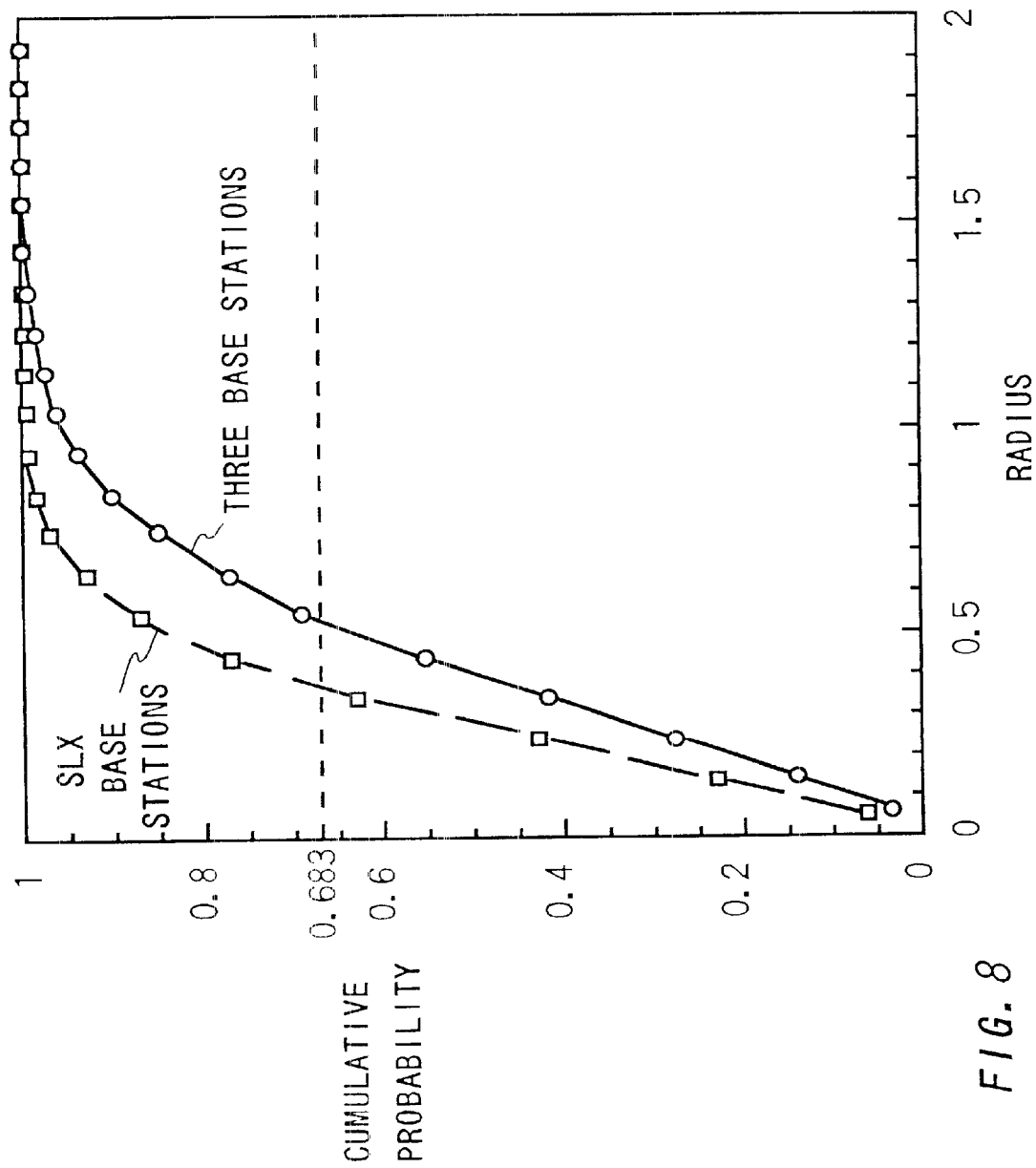
FIG. 8 is a graph showing the relationship between a radius and a cumulative probability.

FIG. 8 shows the result of the above simulation, wherein the solid line denotes the cumulative probability resulting from estimation using (i) the three base stations BSs while the dotted line denotes the cumulative probability resulting from estimation using (ii) the sixbase stations BSs. With the radius=1σ, namely, the distance between the centers of gravity and the origin=1σ, the cumulative probability reaches only 68% of mobile stations MSs. To the contrary, the former cumulative probability reaches 95% thereof and further the latter cumulative probability reaches approximate 99% thereof. This proves that employing more base stations BSs acting to estimate the location of the mobile station MS improves the accuracy thereof. To sum up, the fourth embodiment that employs more base stations BSs for measurement allows more accurate estimation.

<Fifth Embodiment>

The preferred fifth embodiment of the mobile communication according to the present invention will be now described hereinafter. The fifth embodiment is almost the same as the fourth embodiment in configuration and operation. Differing from the fourth embodiment, the fifth embodiment features employing base stations BSs less that three, i.e., two base stations BSs. The two base stations BSs measure the distances between each base station BS and the mobile station MS. Using the two distances gives two circles.

Estimating the location of the mobile station MS is carried out on the basis of the two circles. More specifically, since the two circles cross at two points, estimation is performed using the two points, wherein one of them possibly alone suggests the location or all of them possibly cooperate to suggest the location. Though being worse in accuracy as compared with employment of more base stations BSs, such employment of two base stations BSs for estimation can be available, for example, to overcome geographic limitation and traffic limitation of base stations BSs.

While the present invention has been described in terms of the preferred embodiments, the invention is not to be limited thereto, but can be embodied in various ways without departing from the principle of the invention as defined in the appended claims.

What is claimed is:

1. A mobile communication system including a plurality of base stations transmitting and receiving a frame to/from a mobile station, and a manage station managing the plurality of base stations, and wherein:
   of the base stations comprises
      a distance measuring circuit that measures a distance between a respective base station and the mobile station using a radio wave from the mobile station, and notifies the manage station of the distance, and
      a receipt level measuring circuit that measures the receipt level of the radio wave and notifies the manage station of the receipt level;
   the manage station comprises
      an estimating circuit that estimates the location of the mobile station based upon a plurality of distances measured by the plurality of base stations,
      an instructing circuit that instructs the mobile station to control a transmission power of the radio wave so that the plurality of respective receipt levels of the plurality of base stations exceed a threshold, and
      a departure time notifying circuit that notifies the plurality of base stations of the departure time of the radio wave; and
   the mobile station comprises
      a power control circuit that controls the transmission power of the radio wave pursuant to the instructions from the manage circuit received via a base station with a receipt level which exceeds the threshold.

2. A mobile communication system as claimed in claim 1, wherein the estimating circuit prepares a plurality of circles which each have a center indicating the location of one of the plurality of base stations and a radius indicating the corresponding one of the plurality of distances, to estimate the location of mobile station using the plurality of circles.

3. A mobile communication system as claimed in claim 2, wherein the estimating circuit estimates that a point at which the plurality of circles cross represents the location of the mobile station.

4. A mobile communication system as claimed in claim 2, wherein the estimating circuit estimates the location of the mobile station using a plurality of points at which the plurality of circles cross.

5. A mobile communication system as claimed in claim 4, wherein the estimating circuit estimates the location of the mobile station using two or more points close to each other among the plurality of points.

6. A mobile communication system as claimed in claim 5, wherein the estimating circuit estimates that the center of a circumscribed circle with respect to a polygon having the plurality of points represents the location of the mobile station.

7. A mobile communication system as claimed in claim 5, wherein the estimating circuit estimates that the center of an inscribed circle with respect to a polygon having the plurality of points represents the location of the mobile station.

8. A mobile communication system as claimed in claim 5, wherein the estimating circuit estimates that the center of gravity with respect to the polygon having the plurality of points represents the location of the mobile stations.

9. A mobile communication system as claimed in claim 5, wherein the estimating circuit estimates that one of the two or more points represents the location of the mobile station.

10. A mobile communication system as claimed in claim 1, wherein the manage station further comprises a storing circuit which stores locations of the plurality of base stations.

11. A mobile communication system as claimed in claim 10, wherein the mobile station comprises
 a radiating circuit which radiates a radio wave toward the plurality of base stations, and
 wherein the distance measuring circuit comprises
  a receiving circuit which receives the radio wave from the mobile station; and a time measuring circuit which measures the period of time for the radio wave to travel from the mobile station to each base station, and wherein the distance measuring circuit computes the distance using the period of time and the propagation velocity of the radio wave.

12. A mobile communication system as claimed in claim 11, wherein the time measuring circuit measures the period of time using the notified departure time of the radio wave and the arrival thereof.

13. A mobile communication system as claimed in claim 11, wherein the instructing circuit instructs the mobile station to increase the transmission power of the radio wave, upon judging that the plurality of receipt levels are insufficient for estimation.

14. A mobile communication system as claimed in claim 11, wherein the power control circuit increases the transmission power of the radio wave so as allow the plurality of base stations to reproduce the frame.

15. A mobile communication system as claimed in claim 14, wherein the time measuring circuit measures the period of time using the departure time of the frame and the arrival time thereof.

16. A mobile communication system as claimed in claim 11, wherein the power control circuit increases the transmission power of the radio wave so as not to cause an interference to another mobile station.

17. A mobile communication system as claimed in claim 16, wherein the power control circuit increases the transmission power of the radio wave stepwise.

18. A mobile communication system as claimed in claim 11, wherein the manage station further comprises a selecting circuit which selects two or more base stations used for estimation among the plurality of base stations.

19. A mobile communication system as claimed in claim 18, wherein the selecting circuit selects a base station involving the mobile station and base stations adjacent to the base station.

20. A mobile communication system as claimed in claim 18, wherein the power control circuit controls the transmission power of the radio so as to allow at least two or more arbitrary base stations to receive a radio wave sufficient for estimation, and wherein the selecting circuit selects the two or more arbitrary base stations.

21. A mobile communication system as claimed in claim 18, wherein the selecting circuit replaces one of the two or more base stations with another base station according to the receipt levels of the two or more base stations.

22. A mobile communication system as claimed in claim 1, wherein the control circuit of the mobile station controls the transmission power of the radio wave pursuant to the instructions via the base station positioned in a cell in which the mobile station exists.

23. A mobile communication system as claimed in claim 1, wherein said transmission power level is increased to a level less than a maximum possible transmission power level of said mobile station.

24. A method of estimating the location of a mobile station in a mobile communication system in which the mobile station and a plurality of base stations communicate with each other, the method comprising:
 selecting the base stations for measuring distances between the base station and the mobile station;
 checking a receipt level of a radio wave radiated from the mobile station and received by the base stations;
 controlling a transmission power of the radio wave radiated from the mobile station by comparing the receipt level at the base station with a given threshold and increasing the transmission power of the radio wave until the given threshold value is exceeded;
 notifying the plurality of base stations of the departure time of the radio wave;
 ordering the base stations to receive the increased power radio wave radiated from the mobile station;
 measuring with each base station distances between each base station and the mobile station based on receipt of the increased power radio wave; and
 estimating the location of the mobile station based upon the respective distances measured by the base stations.

25. The method of claim 24, wherein the controlling of the transmission power gradually increases the transmission power of an upward frame, which is sent from the mobile station to the base stations based on the comparison.

26. The method of claim 24, wherein the controlling the transmission power decreases the transmission power of an upward frame sent from the mobile station to the base station upon either a co-channel interference or an adjacent channel interference in one of the selected base stations.

27. The method of claim 24, further comprising:
 generating a frame clock at both the base stations and the mobile station and transmitting the frame clock between the base stations and the mobile station with the radio wave;
 detecting a phase difference between the receipt of the frame clock and the generated frame clock at both of the base station and the mobile station, respectively; and
 correcting the phase difference at both the base stations and the mobile station, respectively.

* * * * *